3,133,489
PHOTOGRAPHIC FIELD LENS WITH ADJUSTABLE DIAPHRAGM

Heinz Köppen, Stuttgart, Germany, assignor to Zeiss Ikon Aktiengesellschaft, Stuttgart, Germany
Filed May 29, 1961, Ser. No. 113,310
Claims priority, application Germany June 2, 1960
6 Claims. (Cl. 95—64)

This invention relates to a photographic field lens with adjustable diaphragm and more particularly to the type of photographic field lenses which comprises a focusing mount with an inner mount disposed therewithin which contains optical means and the adjustable diaphragm, said inner mount being displaceable longitudinally relative to the focusing mount by means of a worm drive for distance setting.

For adjustment of the diaphragm opening the field lens is provided with a diaphragm adjustment member which is coupled to the diaphragm in the inner mount. The coupling is effected by means of a diaphragm control ring provided with a projection which engages a longitudinal groove in the diaphragm adjustment member, said groove extending the length of the longitudinal adjustment range of the inner mount so that the diaphragm opening is varied by rotation of said diaphragm adjustment member. The diaphragm adjustment member may be provided with a manually operable adjustment handle or it may be formed as a coupling means between the diaphragm control ring and a diaphragm adjustment means mounted in a camera to which the field lens is attached. In the latter case a separate adjustment handle on the field lens is superfluous.

For balancing or synchronization of a diaphragm scale on the focusing mount or on the camera itself with the actual diaphragm opening it is known to provide means which permit insertion of the inner mount in the focusing mount in one predetermined rotary position only and at the same time prevent rotation of the inner mount in the focusing mount. At the same time the diaphragm control ring is coupled with the diaphragm adjustment member in the focusing mount. If the diaphragm adjustment member in the focusing mount is turned, for example, to the end position corresponding to the smallest diaphragm opening the diaphragm opening is varied accordingly. The accurate correspondence between the actual diaphragm opening and the reading on the scale is achieved by rotating a coupling member effecting the connection between the diaphragm adjustment member and the diaphragm adjustment handle on the focusing mount or on the camera in relation to the diaphragm adjustment member to such an extent that the measured diaphragm opening (the smallest diaphragm opening) corresponds with the value readable on the diaphragm scale or the value indicated by engagement between the coupling ring and abutment. This procedure requires the loosening and subsequent tightening of comparatively small screws by means of which the coupling member on the diaphragm adjustment member is adjustably secured. For this reason, said balancing or equalization of the diaphragm values is comparatively cumbersome and time consuming.

An object of the present invention is to eliminate these disadvantages.

Another object of the invention is to enable an extremely accurate balancing or equalization of the diaphragm values.

A further object of the invention is to arrange the inner mount containing the adjustable diaphragm rotatably and lockably so that after locking of the diaphragm control ring said inner mount can be used for balancing or synchronization of the diaphragm with the scale reading. The diaphragm control ring is during this procedure held against rotation by the diaphragm adjustment member in the focusing mount, and turning of the inner mount which under these circumstances acts as a diaphragm control ring is all that is necessary.

An embodiment of the invention is described below with reference to the accompanying drawings in which.

Figure 1:
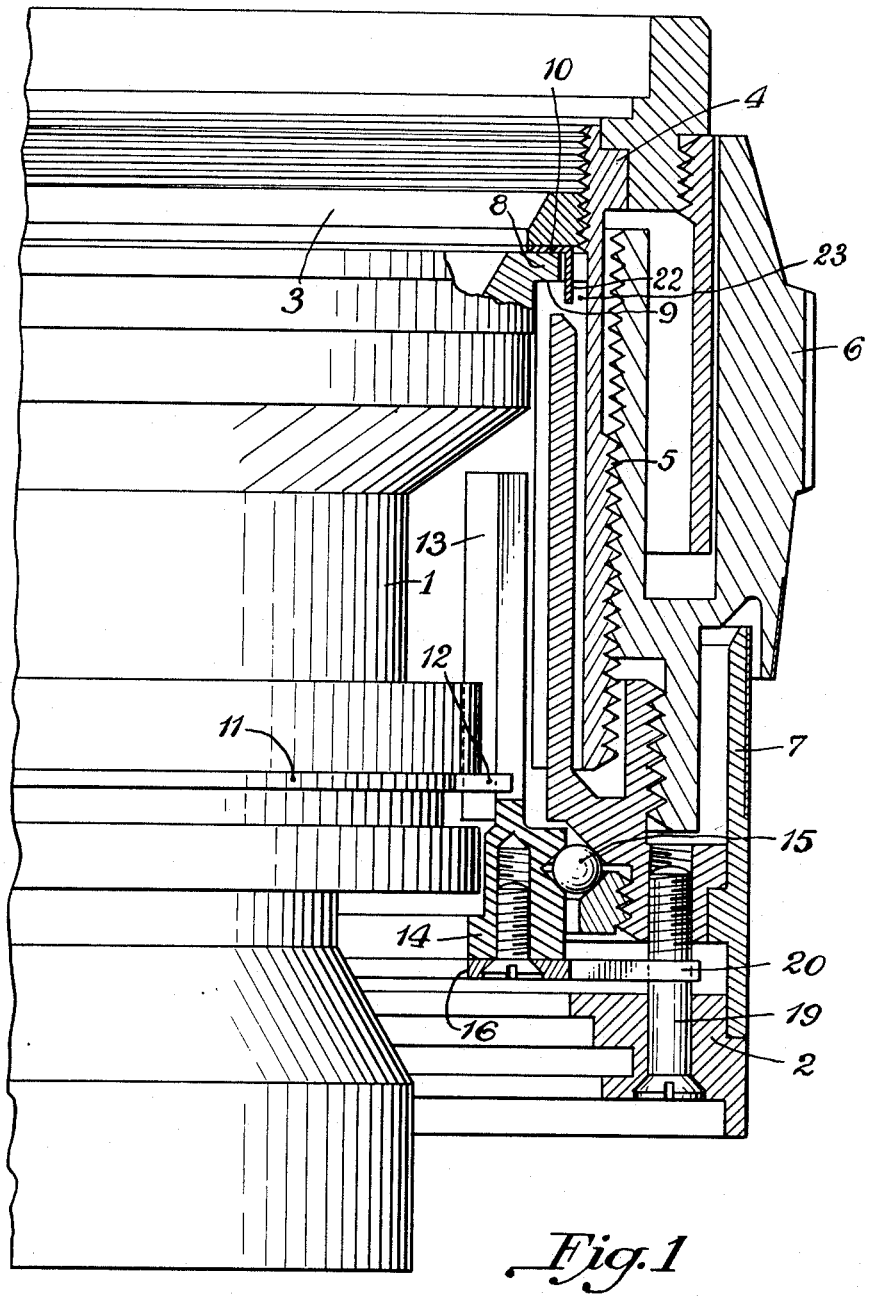
FIG. 1 is a longitudinal section through the photographic field lens.

As shown in FIG. 1, an inner objective mount 1 with which an adjustable diaphragm is combined is disposed within a focusing mount 2 of a photographic field lens and secured thereto by means of a locking screw ring 3. A mount ring 4 of the focusing mount 2 which receives the inner objective mount 1 is in customary manner shiftable relative to a stationary mount member 7 in the direction of the optical axis by means of a worm drive 5 through turning of a distance adjustment ring 6.

Figure 2:
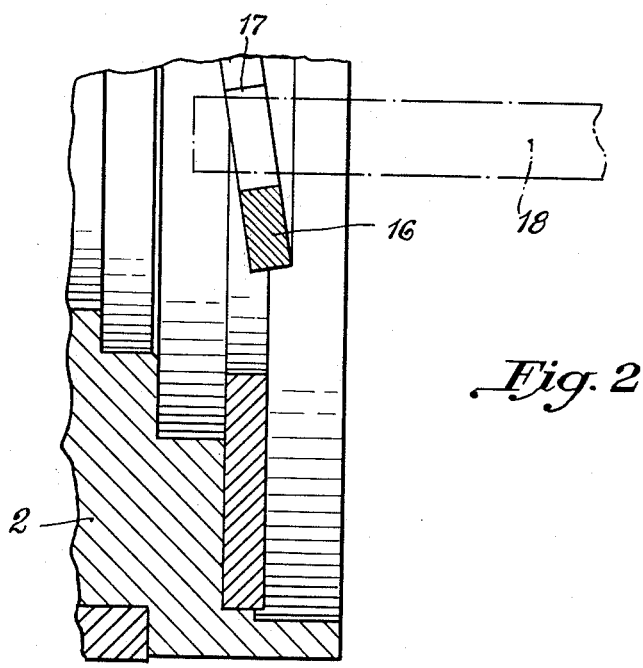
FIG. 2 shows the coupling of the diaphragm adjustment means to actuating means on the camera.
Figure 3:
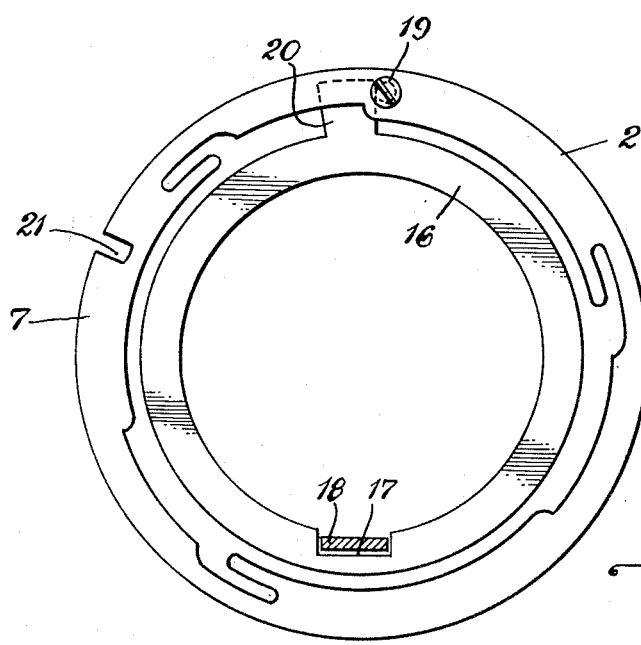
FIG. 3 is an end view of the field lens facing the camera.

Before the diaphragm carrying inner mount 1 of the field lens is finally secured by means of the locking screw ring 3, said inner mount 1 is rotatable within the focusing mount 2. In inserting the inner mount 1 in the focusing mount 2 care must only be taken that a diaphragm control ring 11 with a catch member 12 engages in a coupling element 13 of a diaphragm adjustment member 14 in the focusing mount 2, said coupling element 13 extending along the entire adjustment path of the objective. The diaphragm adjustment member 14 in this case consists of a ring which surrounds the inner objective mount and is journalled for easy rotation in the stationary mount member 7 of the focusing mount 2 by means of ball bearing means 15. To the diaphragm adjustment ring 14 a flexible coupling ring 16 is secured which in mounting the field lens in the camera serves the purpose of coupling the diaphragm adjustment ring 14 with its diaphragm adjustment member. To this end the coupling ring 16 is provided in its outwardly flexible part with a recess 17 (FIGS. 2 and 3) in which a coupling element 18 of the camera-side diaphragm adjustment member engages. Naturally, instead of the coupling ring 16, or in addition, to the same, it is also possible to connect an objective-side diaphragm adjustment handle with the diaphragm adjustment ring 14 of the focusing mount 2. In the latter case, a radial abutment element 20 on the coupling ring 16 which in the end positions (the smallest or largest diaphragm opening) of the diaphragm adjustment member 14 abuts against a bolt 19 or a similar element may also be arranged to protrude as an adjustment handle from the focusing mount.

In order to balance synchronize the diaphragm the coupling ring 16 with the diaphragm adjustment member 14 is preferably stopped in relation to the stationary mount ring 7 in one of its two end positions (the smallest or largest diaphragm opening). The balance position of the diaphragm adjustment member 14 is preferably accurately established by means of a gauge, or latching means, which engages on one hand in a notch 21 in the stationary mount ring 7 and on the other hand in the recess 17 in the coupling ring 16. Through the stopping of the diaphragm adjustment member 14 the diaphragm control ring 11 of the inner objective mount 1 coupled therewith is also arrested. The adjustment of the diaphragm is accordingly then only feasible through turning of the objective mount 1 which after stopping of the diaphragm control ring 11 functions as diaphragm control ring. For balancing the diaphragm, the objective mount 1 is, therefore, rotated relative to the focusing mount 2 until the measured diaphragm opening is in agreement with the diaphragm opening predetermined through the balance position of the coupling ring 16 or the diaphragm adjustment member 14 of the focusing mount 2, respectively. Then the objective mount 1 is positively secured in the balanced or synchronized position in relation to the focusing mount 2 by means of the locking screw ring 3.

In the tightening of the locking screw ring 3 a flange 8 of the objective mount is pressed firmly against the facing surface 9 of the inner axially shiftable mount ring 4 of the focusing mount 2. In order to prevent involuntary rotation of the objective mount 1 from the balance position during said procedure an intermediary ring 10, or washer means, held against rotation by the focusing mount 2, is disposed between the screw ring 3 and the flange 8 of the objective mount. Said intermediary ring 10 which for this purpose is provided with a projection 22 engaging a straight longitudinal groove 23 in the inner mount ring 4 of the focusing mount 2, prevents transfer of the rotary movement of the screw ring 3 to the objective mount 1.

Modifications and variations of the embodiment of the invention described in detail above and shown in the drawings are feasible within the scope and spirit of the appended claims.

What I claim is:

1. In a photographic field lens, an inner mount containing optical elements, a diaphragm control ring rotatably mounted in said inner mount and connected with an adjustable diaphragm in said inner mount, a focusing mount surrounding said inner mount, a diaphragm adjustment member between said inner mount and said focusing mount, means rotatably connecting said diaphragm adjustment member with said focusing mount, cooperating abutment means on said diaphragm adjustment member and said focusing mount limiting the rotatability of said diaphragm adjustment member to the range between two rotary end positions in relation to said focusing mount, means connecting said diaphragm control ring with said diaphragm adjustment member, cooperating indicator means connected with said diaphragm adjustment member and said focusing mount to indicate the diaphragm opening corresponding to various rotary positions of said diaphragm adjustment member relative to said focusing mount, latching means locking said diaphragm adjustment member and said diaphragm control ring to said focusing mount and locking means securing said inner mount to said focusing mount, whereby upon release of said locking means and locking of said diaphragm adjustment member and diaphragm control ring to said focusing mount said inner mount may be rotated to a position in which the measured diaphragm opening equals the diaphragm opening shown by said cooperating indicator means prior to re-tightening of said locking means.

2. The photographic field lens as set forth in claim 1, in which said rotary end positions of the diaphragm adjustment member correspond to the smallest and largest diaphragm openings, one of which is used for said equalization procedure.

3. The photographic field lens as set forth in claim 1, including a coupling ring non-rotatably connected with said diaphragm adjustment member and provided with radial projections positioned to abut against bolts in said focusing mount defining said rotary end positions of said diaphragm adjustment member.

4. The photogaphic field lens as set forth in claim 1, including a coupling ring non-rotatably connected with said diaphragm adjustment member and provided with a peripheral recess, and a notch in said focusing mount, the locking of said diaphragm adjustment member with said focusing mount being effected by engaging said latching means with said notch and recess.

5. The photographic field lens as set forth in claim 1, in which said locking means comprises a screw ring threadedly connected with said focusing mount, washer means being non-rotatably connected with said focusing mount and disposed between said inner mount and said screw ring to prevent involuntary rotation of said inner mount during the tightening of said screw ring.

6. The photographic field lens as set forth in claim 5, including a projection on said washer means extending into a longitudinal groove in said focusing ring.

References Cited in the file of this patent

UNITED STATES PATENTS

| 2,334,075 | Davenport | Nov. 9, 1943 |
| 2,369,199 | McGaiken | Feb. 13, 1945 |